United States Patent
Sherlin et al.

(10) Patent No.: US 11,401,775 B2
(45) Date of Patent: Aug. 2, 2022

(54) HIGH STRENGTH CONNECTION FOR COMPOSITE SLEEVE AND COMPOSITE MANDREL AND RELATED METHODS

(71) Applicant: CCDI Composites, Inc., Santa Ana, CA (US)

(72) Inventors: Dennis Sherlin, Hacienda Heights, CA (US); Steven Koon Hung Sim, Placentia, CA (US)

(73) Assignee: CCDI Composites, Inc., Santa Ana, CA (US)

( * ) Notice: Subject to any disclaimer, the term of this patent is extended or adjusted under 35 U.S.C. 154(b) by 80 days.

(21) Appl. No.: 17/027,336

(22) Filed: Sep. 21, 2020

(65) Prior Publication Data

US 2021/0095542 A1 Apr. 1, 2021

Related U.S. Application Data

(60) Provisional application No. 62/909,129, filed on Oct. 1, 2019.

(51) Int. Cl.
| | |
|---|---|
| *E21B 33/129* | (2006.01) |
| *E21B 33/134* | (2006.01) |
| *B32B 5/12* | (2006.01) |
| *B32B 1/08* | (2006.01) |
| *E21B 34/10* | (2006.01) |

(52) U.S. Cl.
CPC ............ *E21B 33/1291* (2013.01); *B32B 1/08* (2013.01); *B32B 5/12* (2013.01); *E21B 33/134* (2013.01); *E21B 34/103* (2013.01)

(58) Field of Classification Search
CPC .... E21B 33/1291; E21B 33/129; E21B 33/12; E21B 33/1208; E21B 33/134; E21B 33/1204; E21B 34/103; B32B 5/12; B32B 1/08
See application file for complete search history.

(56) References Cited

U.S. PATENT DOCUMENTS

| | | | | |
|---|---|---|---|---|
| 6,220,349 | B1 * | 4/2001 | Vargus | E21B 33/129 166/138 |
| 7,779,928 | B2 * | 8/2010 | Turley | E21B 33/1208 166/387 |
| 8,579,023 | B1 * | 11/2013 | Nish | E21B 33/128 166/134 |
| 10,000,989 | B2 * | 6/2018 | Sherlin | E21B 33/1208 |
| 10,626,696 | B1 * | 4/2020 | Branton | E21B 33/1293 |
| 10,780,671 | B2 * | 9/2020 | Sjostedt | B32B 1/08 |
| 10,801,300 | B2 * | 10/2020 | Saeed | E21B 33/1293 |
| 2011/0048740 | A1 * | 3/2011 | Ward | E21B 33/134 166/381 |
| 2011/0232899 | A1 * | 9/2011 | Porter | E21B 33/1292 166/181 |

(Continued)

*Primary Examiner* — Yong-Suk (Philip) Ro
(74) *Attorney, Agent, or Firm* — Klein, O'Neill & Singh, LLP

(57) ABSTRACT

A composite downhole tool, such as a frac plug or a bridge plug, having a composite sleeve located around a composite mandrel and defining an overlapping or overlapped section between the two. One or more shear pins with each shear pin having a pin hole is provided with the downhole tool to reinforce the downhole tool from interlaminate shear. The one or more shear pins can further be reinforced from rotation by overlapping at least part of the one or more pins with a lip of a ring.

28 Claims, 5 Drawing Sheets

(56) References Cited

U.S. PATENT DOCUMENTS

| | | | |
|---|---|---|---|
| 2013/0327517 A1* | 12/2013 | Good, III | B32B 1/08 |
| | | | 166/192 |
| 2015/0013996 A1* | 1/2015 | Davies | E21B 23/01 |
| | | | 166/382 |
| 2018/0238133 A1* | 8/2018 | Fripp | E21B 29/02 |

* cited by examiner

HIGH STRENGTH CONNECTION FOR COMPOSITE SLEEVE AND COMPOSITE MANDREL AND RELATED METHODS

FIELD OF ART

The present disclosure is directed to the field of composite downhole tools, such as composite frac and bridge plugs.

BACKGROUND

In oil and gas well completion operations, frac plugs and bridge plugs are necessary for zonal isolation and multi-zone hydraulic fracturing processes. The advantages of frac and bridge plugs made from composite materials is well established since these products significantly reduce drill-out (removal) time compared to metallic frac and bridge plugs. A frac plug or bridge plug made of composite materials typically has a central composite tubular mandrel with integral composite sleeves at both ends to restrain the functional elements of the plug (slips, cones, gland) so that the assembly both grips the well casing and seals the plug to the well casing. However, as drilling for oil and gas extends deeper, the composite frac and bridge plugs are expected to sustain higher pressures and operating temperatures. Thus, there is a need for improved frac and bridge plugs.

Accordingly, there is a need in the art for an improved frac and bridge plug sleeve to mandrel connection that can sustain higher pressures and operating temperatures.

SUMMARY

Aspects of the present disclosure are directed to a composite downhole tool that may comprise a composite sleeve that may have an elongated body made from a plurality of composite laminate layers that may have a length between a first end and a second end, an exterior surface, an interior surface that may define a composite sleeve bore. The composite downhole tool may further include a composite mandrel that may have an elongated body made from a plurality of composite laminate layers having a length, an exterior surface, and an interior surface that may define a composite mandrel bore. At least part of the exterior surface of the composite mandrel may be located inside the composite sleeve bore and may contact at least part of the interior surface of the composite sleeve and may define an overlapped section that is fixed by adhesive bonding. The composite downhole tool may further include a pin hole that may comprise a perimeter defining an opening. Said perimeter may be located at a lower end, elevation-wise, of the overlapped section and at the composite mandrel below the second end, and a shear pin may be located in the pin hole.

There may be a composite downhole tool wherein the pin hole may be a first pin hole and may further comprise a second pin hole that may be located within the overlapped section entirely, and wherein a second pin may be located in the second pin hole.

There may be a composite downhole tool wherein the pin hole may be a first pin hole and may further comprise a second pin hole that may be spaced from the first pin hole, said second pin hole may comprise a perimeter that may define an opening and said perimeter of the second pin hole may be located at the lower end, elevation-wise, of the overlapped section and at the composite mandrel below the second end.

There may be a composite downhole tool wherein the pin hole may extend from the exterior surface of the composite sleeve to the interior surface of the composite sleeve and may extend from the exterior surface of the composite mandrel to a depth that may be less than a total thickness of the composite mandrel to expose one or more of the plurality of composite laminate layers of the composite mandrel. Further, the pin hole may have varying depth along the perimeter of the pin hole. Further, the pin hole on the composite mandrel may have concave sides that may extend from the lower end of the overlapped section into the overlapped section or inclined sides that may extend from the lower end of the overlapped section into the overlapped section.

The composite downhole tool may further comprise a slip ring, a slip wedge, and a packer ring that may be located on the exterior surface of the composite mandrel.

The composite downhole tool may further comprise a ball seat that may be located within the composite sleeve bore.

There may be a composite downhole tool wherein at least three spaced apart pin holes may be located at a lower end, elevation-wise, of the overlapped section and at the composite mandrel below the second end.

There may be a composite downhole tool wherein the at least three spaced apart pin holes may be equally spaced apart from one another.

There may be a composite downhole tool wherein only a part of the perimeter of the pin hole may be formed through the exterior surface of the composite sleeve and all of the perimeter of the pin hole may be formed through the exterior surface of the composite mandrel.

The composite downhole tool may further comprise a spacer ring wherein the shear pin may be in flush contact with a lip of the spacer ring.

There may also be a composite downhole structure comprising a tubular composite sleeve that may have an elongated body that may be defined by a length, an exterior surface, and an interior surface defining a composite sleeve bore and a plurality of laminate layers including an innermost laminate layer that may define, at least in part, the composite sleeve bore and an outermost laminate layer that may define, at least in part, the exterior surface. The composite downhole structure may further include a composite mandrel that may have an elongated body that may be defined by a length, an exterior surface, and an interior surface that may define a composite mandrel bore, and a plurality of laminate layers that may include an innermost laminate layer that may define, at least in part, the composite mandrel bore, and an outermost laminate layer that may define, at least in part, the exterior surface. The composite downhole structure may further include a pin hole that may be formed through the exterior surface of the composite sleeve, the plurality of laminate layers of the composite sleeve, and the interior surface of the composite sleeve. The composite downhole structure may further include a pin hole that may be formed through the exterior surface of the composite mandrel and several layers of the plurality of laminate layers of the composite mandrel. The pin hole of the composite sleeve and the pin hole of the composite mandrel may be aligned to define a common pin hole having a cavity with a partially enclosed perimeter at the composite sleeve and an enclosed perimeter at the composite mandrel. A pin may be located in the common pin hole so that at least some of the plurality of laminate layers of the composite sleeve and of the several laminate layers of the composite mandrel may abut the shear pin to distribute load across multiple different laminate layers.

There may be a composite downhole tool wherein the common pin hole may be a first common pin hole and may further comprise a pin hole formed through the exterior surface of the composite sleeve, the plurality of laminate layers of the composite sleeve, and the interior surface of the composite sleeve, and a pin hole that may be formed through the exterior surface of the composite mandrel and several layers of the plurality of laminate layers of the composite mandrel. The pin hole of the composite sleeve and the pin hole of the composite mandrel may be aligned to define a second common pin hole having a cavity with an enclosed perimeter formed through the composite sleeve and the composite mandrel.

There may be a composite downhole tool wherein the common pin hole may be a first common pin hole and wherein a second common pin hole having a shear pin located therein may be provided between the composite sleeve and the composite mandrel and may be spaced from the first common pin hole.

The composite downhole tool wherein the common pin hole may have a top and a bottom, elevation-wise, and the perimeter of the common pin hole may extend from the bottom of the common pin hole in a concave fashion or an inclined fashion. Further, the perimeter may have a round shape, a three-sided shape, an oval shape, or a polygonal shape with non-parallel sides.

There may be a composite downhole tool wherein the shear pin may be a first shear pin and the common pin hole may be sized and shaped to accommodate a second shear pin located next to the first shear pin.

The composite downhole tool may further comprise adhesive in the common pin hole.

There may be a composite downhole tool wherein the composite sleeve may have a first end and a second end. The first end may be spaced from the composite mandrel and the second end may surround the composite mandrel.

There may be a composite downhole tool wherein the partially enclosed perimeter at the composite sleeve may have a gap and the partially enclosed perimeter may extend from the partially enclosed perimeter gap in a concave fashion or an inclined fashion. Further, the gap may be between 5% up to 48% of the perimeter.

The composite downhole tool may further comprise a spacer ring wherein the shear pin may be in flush contact with a lip of the spacer ring.

Another aspect of the present disclosure is a method for forming a downhole tool that may comprise forming a composite tubular composite sleeve with a plurality of laminate layers. The tubular composite sleeve may comprise a first end, a second end, an exterior surface and an interior surface defining a composite sleeve bore. The method may further include forming a composite mandrel with a plurality of laminate layers. The composite mandrel may comprise an exterior surface and an interior surface that may define a lengthwise composite mandrel bore. The method may further include fixing at least part of the exterior surface of the composite mandrel inside the composite sleeve bore and at least part of the interior surface of the composite sleeve and defining an overlapped section with an adhesive. The method may further include machining a pin hole at a lower end, elevation-wise, of the overlapped section and at the composite mandrel below the second end. The method may further include positioning a shear pin in the pin hole so that at least some of the plurality of laminate layers of the composite sleeve and of the several laminate layers of the composite mandrel may abut the shear pin to distribute load across multiple different laminate layers.

There may be a method wherein the pin hole may be a first pin hole and the shear pin may be a first shear pin that may further comprise machining a second pin hole within the overlapped section entirely, and positioning a second shear pin in the second pin hole so that at least some of the plurality of laminate layers of the composite sleeve and of the several laminate layers of the composite mandrel may abut the second shear pin to distribute load across multiple different laminate layers.

The method may further comprise machining a pin hole on the composite sleeve that may extend from the exterior surface of the composite sleeve to the interior surface of the composite sleeve and machining a pin hole on the composite mandrel that may extend from the exterior surface of the composite mandrel to expose one or more of the plurality of composite laminate layers of the composite mandrel.

There may be a method wherein the pin hole may be a first pin hole that may further comprise machining a second pin hole spaced apart from the first pin hole located at the lower end, elevation-wise, of the overlapped section and at the composite mandrel below the second end.

The method may further comprise inserting a spacer ring around the downhole tool such that the shear pin may be in flush contact with a lip of the spacer ring.

Aspects of the invention further include a composite downhole tool comprising: a composite mandrel having an elongated body made from a plurality of composite laminate layers having a length and an interior surface defining a composite mandrel bore; a composite sleeve having an elongated body made from a plurality of composite laminate layers having a length between a first end and a second end, an exterior surface, a sleeve section that overlaps with the composite mandrel, and a sleeve section that is located above, elevation-wise, an upper end of the mandrel; a pin hole comprising a perimeter defining an opening, part of said perimeter located at a lower end, elevation-wise, of the overlapped section and part of said perimeter at the composite mandrel below the second end of the sleeve; a shear pin located in the pin hole; and a spacer ring having a bore located around the mandrel.

A still yet further aspect of the invention includes a composite downhole structure comprising: a composite mandrel having an elongated body made from a plurality of composite laminate layers having a length and an interior surface defining a composite mandrel bore; a composite sleeve having an elongated body made from a plurality of composite laminate layers having a length between a first end and a second end, an exterior surface, a sleeve section that overlaps with the composite mandrel, and a sleeve section that is located above, elevation-wise, an upper end of the mandrel; a pin hole formed through the exterior surface of the composite sleeve and the plurality of laminate layers of the composite sleeve; a pin hole formed through several layers of the plurality of laminate layers of the composite mandrel but not through the interior surface of the composite mandrel; wherein the pin hole of the composite sleeve and the pin hole of the composite mandrel are aligned to define a common pin hole having a cavity with a partially enclosed perimeter at the composite sleeve and an enclosed perimeter at the composite mandrel; and wherein a shear pin is located in the common pin hole so that at least some of the plurality of laminate layers of the composite sleeve and of the several laminate layers of the composite mandrel abut the shear pin to distribute load across multiple different laminate layers.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the currently preferred embodiments of downhole tools that include sleeve or coupling to mandrel connections provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Broadly speaking, aspects of the present devices, systems, and methods are directed to downhole tools with sleeve or coupling to mandrel connections having improved interlaminate shear strength.

Figure 1:
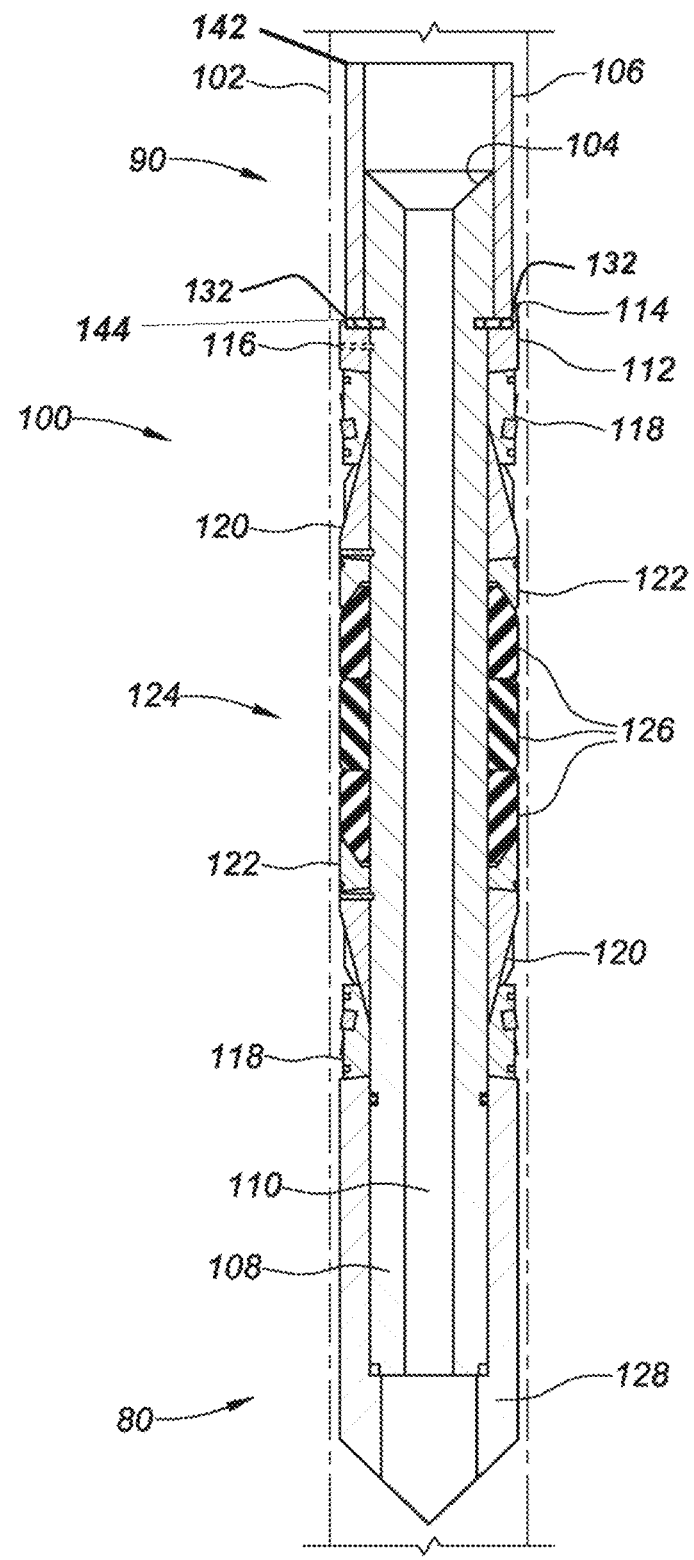
FIG. 1 is a schematic cross-sectional side view of a composite frac plug or bridge plug in accordance with aspects of the present disclosure.

With reference now to FIG. 1, a downhole tool 100 provided in accordance with aspects of the present disclosure is shown situated in a well bore 102, which can be a production casing, an intermediate casing, or a surface casing. The downhole tool 100 may be a frac or bridge plug system and include a ball seat 104 for receiving a closing ball or frac ball (not shown). However, in other embodiments, the downhole tool may be a bridge plug that utilizes the high strength connection and system of bonding of the present disclosure.

As shown, the downhole tool 100 may have a first end 90 and a second end 80 and a mandrel 108 running through the tool. A sleeve 106 is shown that may be attached to the mandrel 108, which may have a bore 110 for fluid flow. The sleeve 106 may have a first end 142 located above, elevation-wise, a second end 144 (shown in FIG. 2 for clarity). As shown, the second end 144, may be located over and around the mandrel so that part of the sleeve 106 and the mandrel 108 overlap, or have sections that overlap.

In some examples, rather than separately forming the sleeve 106 and then attaching the sleeve around the outside of the mandrel 108, the sleeve can be wound onto the mandrel during fabrication. The final size and dimension of the sleeve around the mandrel can then be machined as desired, or optionally not machined.

A spacer ring 112 may be located below the sleeve 106 and abuts the second end 144 of the sleeve 106, which may be considered a shoulder 114, which has a surface that extends radially of the lengthwise axis of the bore 110 and presents a structure for pushing or abutting against. The spacer ring 112 can be made from a composite material and can be called a composite ring 112. The spacer ring 112 may be pinned to the mandrel 108 with one or more ring pins 116, which can penetrate through all of the wall thickness of the spacer ring and into part of the wall thickness of the mandrel 108. The spacer ring 112 may be used to support from sliding further towards the second end 80 of the mandrel 108. The sleeve 106 can be secured to the mandrel 108 using one or more shear pins 132 in addition to using adhesive or bonding at the interface between the two. In the embodiment in which the sleeve 106 is wound with the mandrel 108, the one or more shear pins 132 can be utilized to increase interlaminate shear strength. In an alternative embodiment, the spacer ring 112 may be connected to the downhole tool 100 with a pin-less connection. In an example, three spaced apart shear pins 132, four spaced apart shear pins, or five spaced apart shear pins are incorporated to secure the sleeve 106 to the mandrel 108. In a preferred embodiment, the shear pins are equally spaced from one another around the periphery of the sleeve but un-even spacing between the shear pins can help to increase the interlaminate shear strength. In other examples, at least two spaced apart shear pins 132 can be used to secure the sleeve 106 to the mandrel, which can include three, four, five, six, or greater integers of shear pins.

The spacer ring 112 may support a slip back up or slip ring 118, which may have a tapered interior surface for riding up against a tapered surface of the slip wedge 120 to bite against the casing when set. A second set of slip wedge 120 and slip ring 118 may be provided closer to the second end 80 for gripping the downhole tool 100 against the casing.

In an example, the spacer ring or composite ring 112 has a generally flat or planar upper end for abutting the shoulder 114 of the sleeve 106. In another example, the spacer ring 112 has an outside diameter that is larger than the diameter of the sleeve 106, or larger than the dimension defined by opposite outer edges of the shoulder 114, which can be the diameter of the sleeve at the shoulder 114 or can be the outer most dimension of the sleeve if the sleeve has a shape that is other than generally cylindrical. This larger outer dimension of the spacer ring 112 allows an annular space to be machined into the spacer ring 112 to support the second end 144 of the sleeve 106, as further discussed below.

Figure 3:
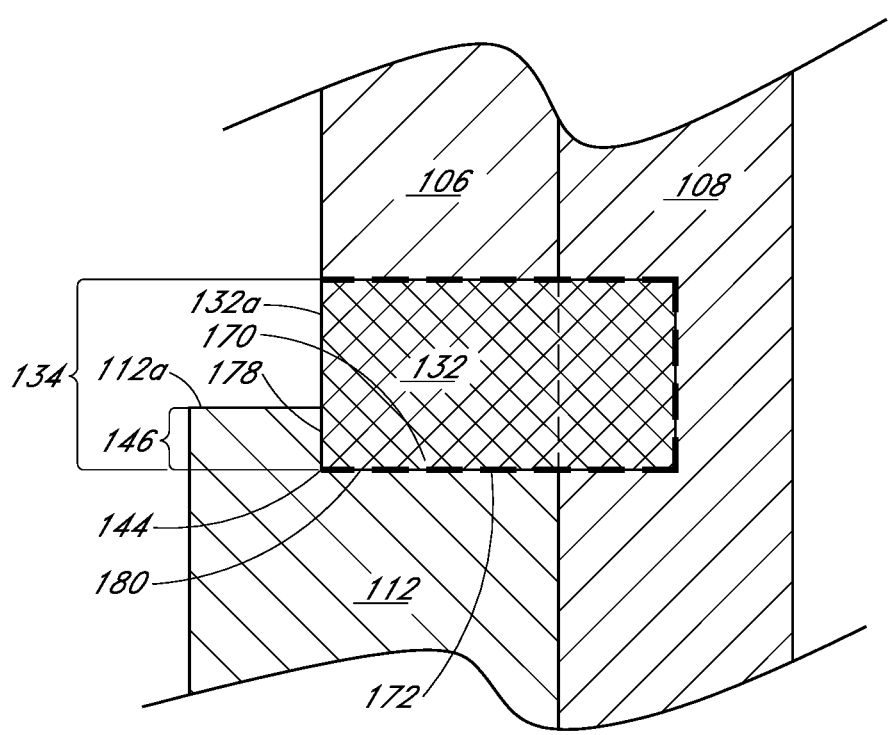
FIG. 3 is a magnified schematic cross-sectional side view of the sleeve to mandrel connection of FIG. 2 showing a shear pin.

FIG. 3 is an enlarged partial cross-sectional view of an embodiment showing part of the sleeve 106, mandrel 108, and spacer ring 112. As shown, the spacer ring 112 has a larger outside dimension than the outside dimension of the sleeve 106. The spacer ring 112 has a first end 112a and wherein a recess 170 is machined into the first end 112a. The machined structure defines an annular support cavity or recess 170. The annular support cavity 170 has a lip 146 and a support end 172. In an example, the lip 146 has an interior wall surface and the support end 172 has a surface and the two surfaces are generally at right angle or orthogonal to one another. In other examples, the two surfaces can be other than right-angle. For discussion purposes, the two surfaces of the lip 146 and the support end 172 can be referred to as a support rim 178.

In an example, the placement or location of the two or more shear pins 132 is at the second end 144 of the sleeve 106. The outer edge, such as the lower arc profile of the outer diameter, of the two or more shear pins 132 can be aligned with the end surface of the second end 144. In other examples, the two or more shear pins can be located below, elevation-wise, the end surface of the second end 144. The second end 144 of the sleeve and the shear pins 132 can then be machined, such as by using a CNC machine, to form a working end or active end 180 at the second end 144 of the sleeve 106. Preferably, the active end 180 is generally planar such that when the active end is viewed, it is made up the second end of the sleeve and the shear pins. In some examples, the exterior end surface 132a of the shear pins 132, as well as the exterior surface of sleeve are both machined for concentricity. This allows the sleeve 106 and the pins 132 to be in flush contact with the support rim 178 of the spacer ring 112. As shown, the shear pins 132 may be inserted through a pin hole 134 formed through the sleeve 106 and partially through the mandrel 108.

In still other examples, the pin hole 134 for each shear pin 132, if more than one shear pins are utilized, are machined entirely within the sleeve 106, above the second end 144, but at a location sufficiently close to the second end 144 so that there is overlapping between at least part of the shear pin 132 and the support rim 178 of the spacer ring 112 in the installed position of FIG. 3. In other words, the one or more machined pin holes 134 each comprises a full circumference. In yet another example, the pin hole 134 for each shear pin 132, if more than one shear pins are utilized, are machined to generally coincide to the end surface of the second end 144 so that there is overlapping between at least part of the shear pin 132 and the support rim 178 in the installed position of FIG. 3.

In still other example, the spacer ring 112 does not incorporate a recess or a lip but merely a flat or rounded end. In this alternative embodiment, the one or more shear pins 132 can be inserted into corresponding one or more pin holes. Each of the one or more pin holes can be provided in the overlapped section, where the sleeve and the mandrel overlap, for embodiments in which the sleeve is formed separately or wound together with the mandrel, and part of the pin hole circumference can be located below the second end 144 of the sleeve. In other words, when looking at the sleeve from a side, the pin hole opening is partially truncated where the second end 144 of the sleeve is located.

With reference again to FIG. 1, a packer shoe 122 may be provided adjacent to the packer assembly 124, which in the current embodiment may have three packer rings 126. In other examples, a different number of packer rings 126 may be used, such as one, two, three, or more. The upper and lower packer shoes 122 may be configured to compress the packer assembly 124 when the downhole tool 100 is set, which may cause the three packer rings 126 to expand outwardly away from the mandrel 108 to seal against the casing.

A nose section 128 may be provided at the second end 80 of the downhole tool 100, which may be used to engage a crown (not shown) of another downhole tool. In yet other examples, a coupling or another sleeve, similar to sleeve 106, may be attached to the mandrel 108 at the second end 80.

Figure 2:
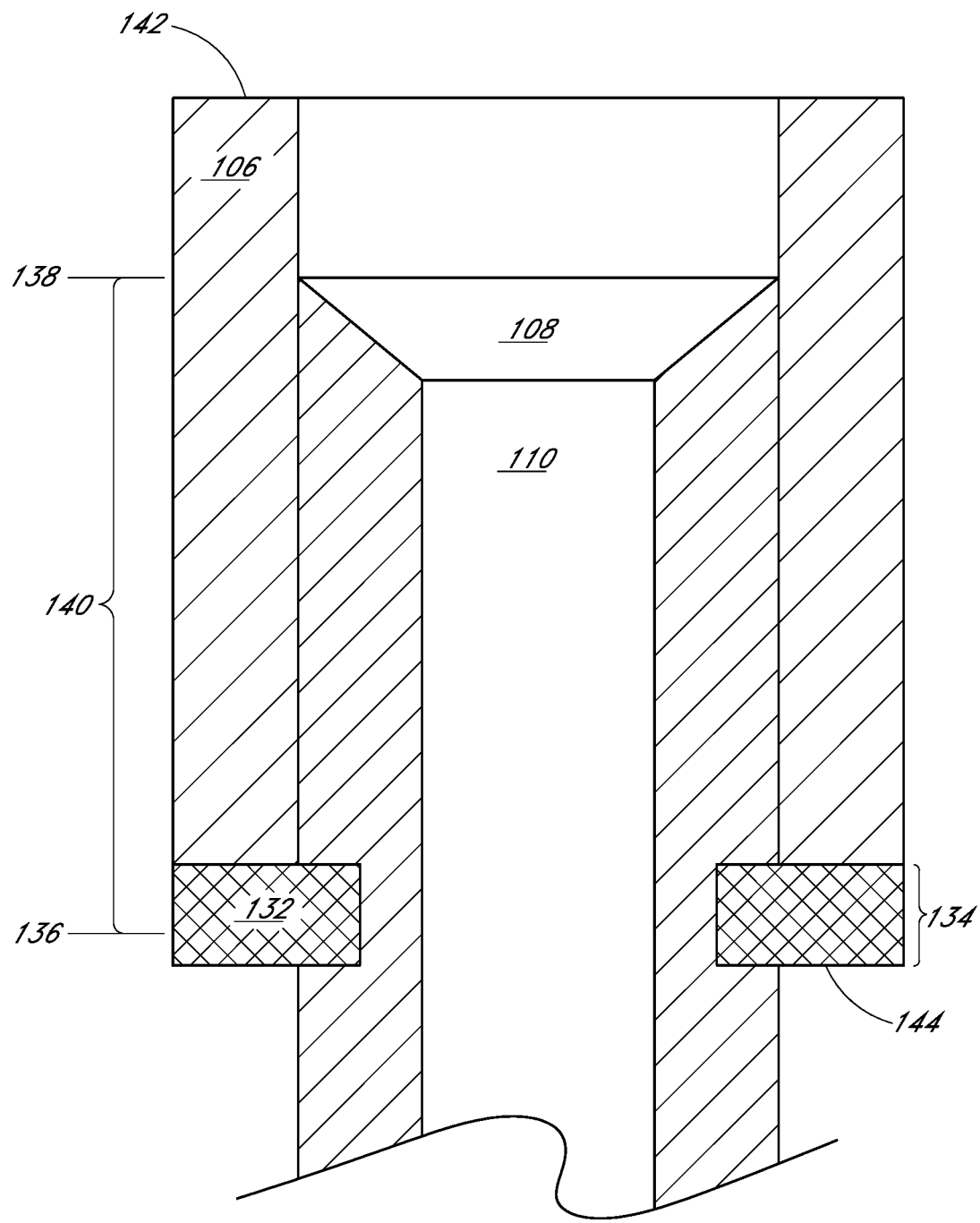
FIG. 2 is a simplified schematic cross-sectional side view of a sleeve to mandrel connection comprising a plurality of shear pins.

With reference now to FIG. 2, a sleeve 106 to mandrel 108 connection for a composite downhole tool 100 with at least one shear pin 132 is disclosed. The sleeve 106 and the mandrel 108 both may be made from composite materials, such as by forming them from a plurality of laminate composite layers and resin or adhesive. The downhole tool 100 may also include other plug components, for example other components discussed above with reference to FIG. 1, but are not shown in FIG. 2 for clarity. For example, the downhole tool 100 may comprise another sleeve located at the second end 80 in FIG. 1.

A shear pin 132 may be inserted through a pin hole 134 formed in the sleeve 106, which has a first end 142 and a second end 144 (shown in FIG. 3), and partially through the wall thickness of the mandrel 108. When the sleeve 106 is mounted around the mandrel 108, the sleeve and the mandrel have an overlapping section 140 or share a section that overlaps. The overlapping section 140 can have a lower end 136 and an upper end 138. The shear pins 132 may be placed or inserted at or near the lower end 136, elevation-wise, of the overlapping section 140. The lower end 136 can coincide with the second end 144 of the sleeve, and/or the machined working end or active end 180 of the combination sleeve 106 and shear pins 132, as previously defined. The spacer ring 112 shown in FIG. 1 and in more detail in FIG. 3 may be positioned around the sleeve 106 and the mandrel 108 such that a lip 146 of the spacer ring 112 may be flush against the shear pin 132. The location of each of the one or more shear pins 132 relative to the second end 136 of the overlapping section and the sleeve 144 (FIG. 3), including the working end or active end 180, may be implemented as discussed above for claim 3.

Each downhole tool may have one or more shear pins 132, a pin hole 134 for each shear pin 132, and the two shear pins 132 shown in FIG. 2 are exemplary only. If more than one shear pin is utilized, the shear pins 132 may be spaced apart from each other. The spacing may be evenly distributed or unevenly distributed along the circumference of the sleeve. The shear pins 132 may have the same lengths or different lengths to penetrate different depths and the lengths depicted are only exemplary. The shear pins 132 may be made from composite materials to facilitate drilling out the downhole tool 100 after use. The shear pins 132 may be bonded into the downhole tool 100 when installed through the respective pin hole 134. The shear pins 132 may further be machined, such as with a CNC, to ensure concentricity and to form the working end 180 (FIG. 3) of the sleeve 106, at the second end of the overlapping section 140. The interface between the sleeve 106 and the mandrel 108 may also be bonded with resin or adhesive to further secure the two. The shear pins 132 may provide enough shear strength to offset the loss of strength for the adhesive bond at elevated temperatures. If the operating temperatures, set loads and pressures for the downhole tool 100 are low enough for adhesive bonding to work satisfactorily by itself, then the shear pin 132 may be omitted.

With reference again to FIG. 3, a detailed view of the sleeve 106 to mandrel 108 connection for the composite downhole tool 100 of FIG. 2 with at least one shear pin 132 is shown. The present view can also represent interactions among the sleeve 106, mandrel 108, spacer ring 112, and shear pin 132 of other downhole tools disclosed elsewhere herein. A pin hole 134 may be drilled through the sleeve 106 and partially through the body or wall thickness of the mandrel 108 at or adjacent the second end 144 of the sleeve 106 for receiving a shear pin 132. In some examples, the pin hole 134 is drilled through the sleeve 106 at the second end 144 so that only part of the drilled hole or pin hole 134 is within the sleeve, such that the circumference of the pin hole is truncated or is not a complete circumference. In other words, part of the arc or part of the edge of the drilled hole or pin hole 134 is outside of the sleeve 106, below the second end 144. As discussed above, after the shear pin 132 is inserted into the pin hole, the shear pin 132 and the second end 144 of the sleeve are machined to create or form the working end or active end 180 of the sleeve. For example, when the working end or active end 180 of the sleeve is formed by machining, the flatness, squareness, or contour of the surface of the active end 180 can be controlled, at least to some extent, by machining to ensure a snug fit with the support rim 178 of the spacer ring 112.

The ratio of the portion of the pin hole 134 below the second end 144 of the sleeve 106 to the entirety of the pin hole 134, before the creation of the working end or active end 180, can vary. The more the edge or the arc of the pin hole is located below the second end 144, the more the shear pin 132 will need to be machined in forming the active end 180. In some examples, the portion of the pin hole 134 below the second end 144 of the sleeve 106 may be between 5% to 48% of a perimeter of the pin hole 134. The partial drilling through the wall thickness of the mandrel 108 may achieve different pin insertion depth and the depth depicted is only exemplary. The fitment of the shear pin 132 into the pin hole 134 may be snug and may be reinforced with adhesive or resin bonding material. The pin hole 134 may be threaded in other uses.

Still referring to FIG. 3, a spacer ring or composite ring 112 may be positioned around the sleeve 106 and the mandrel 108 such that a lip 146 of the spacer ring 112 may be flush against the shear pin 132. In the event the sleeve 106 and the mandrel 108 are subjected to uneven shear stresses, such as when the sleeve is forced to move axially in a first direction and the mandrel is stationary or forced to move axially in an opposite direction, then the sleeve and the mandrel can separate, if the pressure or shear force is sufficiently high. However, since the shear pin 132 has been located at the second end of the sleeve 106 and since there is a snug fit between the shear pin 132 and the support rim 178 of the spacer ring 112, the shear pin will be supported against rotating by the lip 146 of the spacer ring 112. This in turn adds to the bonding strength between the sleeve and the mandrel and to the interlaminate shear strength of the plurality of composite wound layers inside the matrix used to set the multiple layers.

Said differently, in the event the sleeve 106 and the mandrel 108 are subjected to uneven shear stresses, the stresses will cause the sleeve and the mandrel to slide axially relative to one another and since the shear pin 132 is disposed in both the sleeve and the mandrel, the separation will also cause the shear pin 132 to rotate. However, since the exterior of the shear pin 132 is pressed against the support rim 178 in a snug fit, the hoop strength of the spacer ring 112 at the lip 146 will help to resist rotation of the shear pin 132 and therefore resist separation between the sleeve 106 and the mandrel 108.

The coverage of the pin hole 146 by the lip 146 shown in FIG. 3, where the lip 146 extends to reach less than half of the pin hole 134, such as 5% to 49% of the pin hole, is exemplary only. In another example, the lip 146 may extend to reach half of the pin hole 134 to support the shear pin 132 from rotation. In another example, the lip 146 may extend to reach higher than half of the pin hole 134 to support the shear pin 132 from rotation. In another example, the lip 146 may extend to reach the entirety of the pin hole 134 to support the shear pin 132 from rotation. In another example, the lip 146 may extend to reach higher than the entirety of the pin hole 134 to support the shear pin 132 from rotation. The foregoing examples apply equally in embodiments where the pin hole is only partially located within the sleeve 106 or completely within the sleeve. The dimension defined by a distance from the center of the spacer ring 112 to the lip 146 may be equal to the radius of the sleeve 106. The lip 146 may have an exposed top surface that may be parallel or angled to a horizontal plane. The lip 146 may have chamfered, filleted, or perpendicular edges.

Figure 4A:
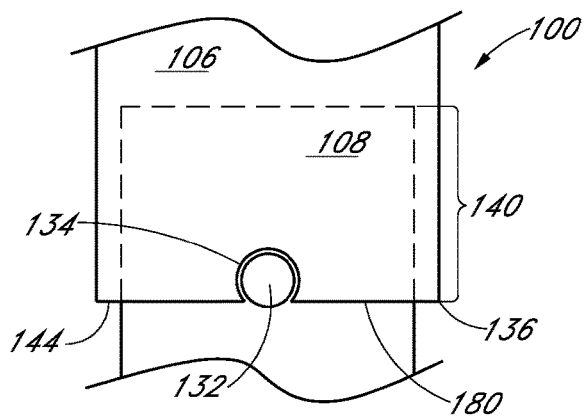
FIG. 4A shows a first alternative sleeve to mandrel connection provided in accordance with aspects of the present disclosure.

With reference now to FIG. 4A, a first alternative sleeve 106 to mandrel 108 connection is provided in accordance with aspects of the present disclosure. A pin hole 134 with a round perimeter may be drilled through the sleeve 106 and partially through the body or wall thickness of the mandrel 108 below the second end 144 of the sleeve 106 for receiving a pin 132 with a round perimeter at a lower end 136, elevation-wise, of an overlapping section 140 of the sleeve 106 and the mandrel 108. The ratio of the portion of the pin hole 134 below the second end 144 of the sleeve 106 to the entirety of the pin hole 134 is shown only as an example and there may be variations where the portion of the pin hole 134 below the second end 144 of the sleeve 106 may be between 5% to 48% of the perimeter of the pin hole 134. The second end 144 of the sleeve may be machined accordingly to create such variation and can be machined to form the working end or active end 180 as previously discussed.

The spacer ring 112 has been omitted in FIG. 4A for clarity but may be incorporated to support the sleeve 106 as discussed above with reference to FIG. 3. There may be one or more shear pins 132 incorporated with the downhole tool 100 of the present embodiment, with a pin hole 134 for each shear pin 132. When more than one shear pin is utilized, the shear pins 132 may be spaced apart from each other or unevenly spaced from one another. The spacing may be evenly distributed. The fitment of the shear pins 132 into the pin holes 134 may be snug. The shear pins 132 may have different lengths and the pin holes 134 may have different depths. The interface between the sleeve 106 and the mandrel 108 may also be typically bonded with adhesive or resin to further secure the two. Further, the location of each shear pin 132 and pin hole 134 relative to the second end 144 of the sleeve 106 may be similar to the locations discussed elsewhere herein, such as with reference to FIG. 3. The locations of the pin holes and shear pins can be selected to ensure overlapping between at least part of each shear pin, and therefore at least part of each pin hole, and the support rim 178 or lip 146 of the spacer ring 112 so that the support rim 178 can support the shear pins from rotating in case of a separation event between the sleeve and the mandrel.

Figure 4B:
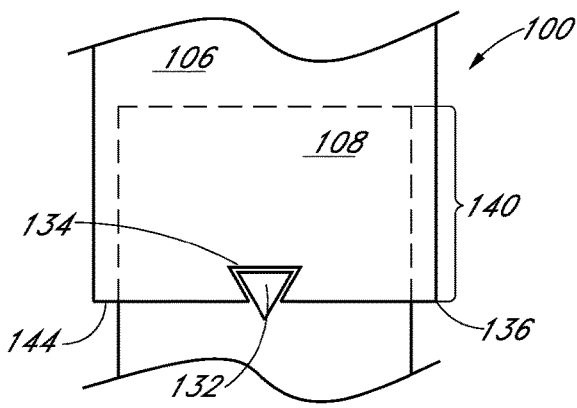
FIG. 4B shows a second alternative sleeve to mandrel connection provided in accordance with aspects of the present disclosure.

With reference now to FIG. 4B, a second alternative sleeve 106 to mandrel 108 connection is provided in accordance with aspects of the present disclosure. A pin hole 134 with a three-sided perimeter may be drilled or machined through the sleeve 106 and partially through the body or wall thickness of the mandrel 108 below the second end 144 of the sleeve 106 for receiving a shear pin 132 with a three-sided perimeter at a lower end 136, elevation-wise, of an overlapping section 140 of the sleeve 106 and the mandrel 108. The three-sided perimeter of the pin hole 134 may have inclined sides that extend from the second end 144 of the sleeve 106 and away from each other. The ratio of the portion of the pin hole 134 below the second end 144 of the sleeve 106 to the entirety of the pin hole 134 is shown only as an example and there may be variations where the portion of the pin hole 134 below the second end 144 of the sleeve 106 may be between 5% to 48% of the perimeter of the pin hole 134. The second end 144 of the sleeve may be machined accordingly to create such variation.

The spacer ring 112 has been omitted in FIG. 4B for clarity but may be incorporated to support the sleeve 106 as discussed above with reference to FIG. 3. There may be one or more shear pins 132 incorporated with the downhole tool 100 of the present embodiment, with a pin hole 134 for each shear pin 132. When more than one shear pin is utilized, the shear pins 132 may be spaced apart from each other. The spacing may be evenly distributed or unevenly distributed around the periphery. The fitment of the shear pins 132 into the pin holes 134 may be snug. The shear pins 132 may have different lengths and the pin holes 134 may have different depths. The interface between the sleeve 106 and the mandrel 108 may also be typically bonded with adhesive or resin to further secure the two. The locations of the pin holes and shear pins can be selected to ensure overlapping between at least part of each shear pin, and therefore at least part of each pin hole, and the support rim 178 or lip 146 of the spacer ring 112 so that the support rim 178 can support the shear pins from rotating in case of a separation event between the sleeve and the mandrel.

Figure 4C:
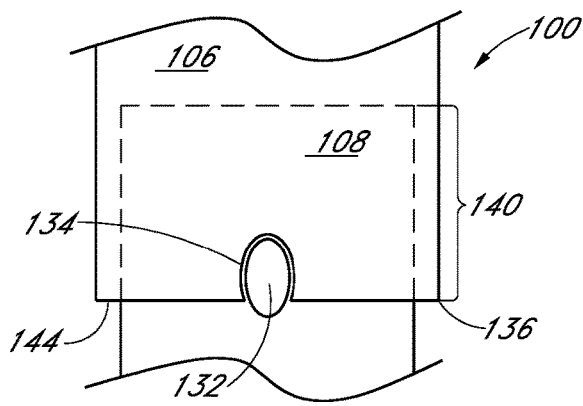
FIG. 4C shows a third alternative sleeve to mandrel connection provided in accordance with aspects of the present disclosure.

With reference now to FIG. 4C, a third alternative sleeve 106 to mandrel 108 connection is provided in accordance with aspects of the present disclosure. A pin hole 134 with an oval perimeter may be drilled through the sleeve 106 and partially through the body of the mandrel 108 below the second end 144 of the sleeve 106 for receiving a shear pin 132 with an oval perimeter at a lower end 136, elevation-wise, of an overlapping section 140 of the sleeve 106 and the mandrel 108. The perimeter of the pin hole 134 may have concaved sides that extend from the second end 144 of the sleeve 106 and away from each other. The concavity of the sides of the perimeter of the pin hole 134 may vary so that the perimeter of the pin hole 134 may take an elliptic shape. The ratio of the portion of the pin hole 134 below the second end 144 of the sleeve 106 to the entirety of the pin hole 134 is shown only as an example and there may be variations where the portion of the pin hole 134 below the second end 144 of the sleeve 106 may be between 5% to 48% of the perimeter of the pin hole 134. The second end 144 of the sleeve may be machined accordingly to create such variation.

The spacer ring 112 has been omitted in FIG. 4C for clarity but may be incorporated to support the sleeve 106 as discussed above with reference to FIG. 3. There may be more than one shear pins 132 incorporated with the downhole tool 100 of the present embodiment, with a pin hole 134 for each shear pin 132. When more than one shear pin is incorporated, the shear pins 132 may be spaced apart from each other. The spacing may be evenly distributed or unevenly distributed around the periphery. The fitment of the shear pins 132 into the pin holes 134 may be snug. The shear pins 132 may have different lengths and the pin holes 134 may have different depths. The interface between the sleeve 106 and the mandrel 108 may also be typically bonded with adhesive or resin to further secure the two. Further, the location of each shear pin 132 and pin hole 134 relative to the second end 144 of the sleeve 106 may be similar to the locations discussed elsewhere herein, such as with reference to FIG. 3. The locations of the pin holes and shear pins can be selected to ensure overlapping between at least part of each shear pin, and therefore at least part of each pin hole, and the support rim 178 or lip 146 of the spacer ring 112 so that the support rim 178 can support the shear pins from rotating in case of a separation event between the sleeve and the mandrel.

Figure 4D:
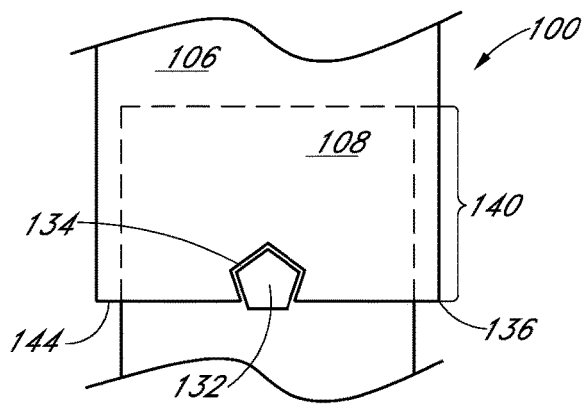
FIG. 4D shows a fourth alternative sleeve to mandrel connection provided in accordance with aspects of the present disclosure.

With reference now to FIG. 4D, a fourth alternative sleeve 106 to mandrel 108 connection is provided in accordance with aspects of the present disclosure. A pin hole 134 with a polygon perimeter with a top, a bottom, and non-parallel sides may be drilled through the sleeve 106 and partially through the body of the mandrel 108 below the second end 144 of the sleeve 106 for receiving a shear pin 132 with a polygon perimeter with a top, a bottom, and non-parallel sides at a lower end 136, elevation-wise, of an overlapping section 140 of the sleeve 106 and the mandrel 108. The polygon perimeter of the pin hole 134 may have a first set of inclined sides that extend from the second end 144 of the sleeve 106 and away from each other. The ratio of the portion of the pin hole 134 below the second end 144 of the sleeve 106 to the entirety of the pin hole 134 is shown only as an example and there may be variations where the portion of the pin hole 134 below the second end 144 of the sleeve 106 may be between 5% to 48% of the perimeter of the pin hole 134. The second end 144 of the sleeve may be machined accordingly to create such variation.

The spacer ring 112 has been omitted in FIG. 4D for clarity but may be incorporated to support the sleeve 106 as discussed above with reference to FIG. 3. There may be one or more shear pins 132 incorporated with the downhole tool 100 of the present embodiment, with a pin hole 134 for each shear pin 132. When more than one shear pin is utilized, the shear pins 132 may be spaced apart from each other. The spacing may be evenly distributed or randomly spaced from one another. The fitment of the shear pins 132 into the pin holes 134 may be snug. The shear pins 132 may have different lengths and the pin holes 134 may have different depths. The interface between the sleeve 106 and the mandrel 108 may also be typically bonded with adhesive or resin to further secure the two. Further, the location of each shear pin 132 and pin hole 134 relative to the second end 144 of the sleeve 106 may be similar to the locations discussed elsewhere herein, such as with reference to FIG. 3. The locations of the pin holes and shear pins can be selected to ensure overlapping between at least part of each shear pin, and therefore at least part of each pin hole, and the support rim 178 or lip 146 of the spacer ring 112 so that the support rim 178 can support the shear pins from rotating in case of a separation event between the sleeve and the mandrel.

Figure 4E:
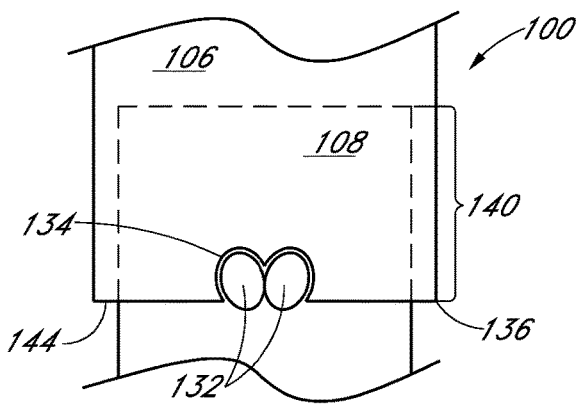
FIG. 4E shows a fifth alternative sleeve to mandrel connection provided in accordance with aspects of the present disclosure.

With reference now to FIG. 4E, a fifth alternative sleeve 106 to mandrel 108 connection is provided in accordance with aspects of the present disclosure. A pin hole 134 may be drilled through the sleeve 106 and partially through the body of the mandrel 108 below the second end 144 of the sleeve 106 for receiving two or more shear pins 132 at a lower end 136, elevation-wise, of an overlapping section 140 of the sleeve 106 and the mandrel 108. As shown, the pin hole 134 resembles two partial circular pin holes that overlap for receiving two adjacent pins within the same pin hole.

The ratio of the portion of the pin hole 134 below the second end 144 of the sleeve 106 to the entirety of the pin hole 134 is shown only as an example and there may be variations where the portion of the pin hole 134 below the second end 144 of the sleeve 106 may be between 5% to 48% of the perimeter of the pin hole 134. The second end 144 of the sleeve may be machined accordingly to create such variation. Perimeters of the two or more shear pins 132 may be round as shown by example or three-sided, oval, or polygons with non-parallel sides. The two or more shear pins 132 may touch each other inside the pin hole 134.

The spacer ring 112 has been omitted in FIG. 4E for clarity but may be incorporated to support the sleeve 106 as discussed above with reference to FIG. 3. There may be more than one shear pins 132 incorporated with the downhole tool 100 of the present embodiment, with a pin hole 134 for each shear pin 132. The shear pins 132 may be spaced apart from each other. The spacing may be evenly distributed or randomly spaced from one another. The fitment of the shear pins 132 into the pin holes 134 may be snug. The shear pins 132 may have different lengths and the pin holes 134 may have different depths. The interface between the sleeve 106 and the mandrel 108 may also be typically bonded with adhesive or resin to further secure the two. Further, the location of each shear pin 132 and pin hole 134 relative to the second end 144 of the sleeve 106 may be similar to the locations discussed elsewhere herein, such as with reference to FIG. 3. The locations of the pin holes and shear pins can be selected to ensure overlapping between at least part of each shear pin, and therefore at least part of each pin hole, and the support rim 178 or lip 146 of the spacer ring 112 so that the support rim 178 can support the shear pins from rotating in case of a separation event between the sleeve and the mandrel.

Figure 5:
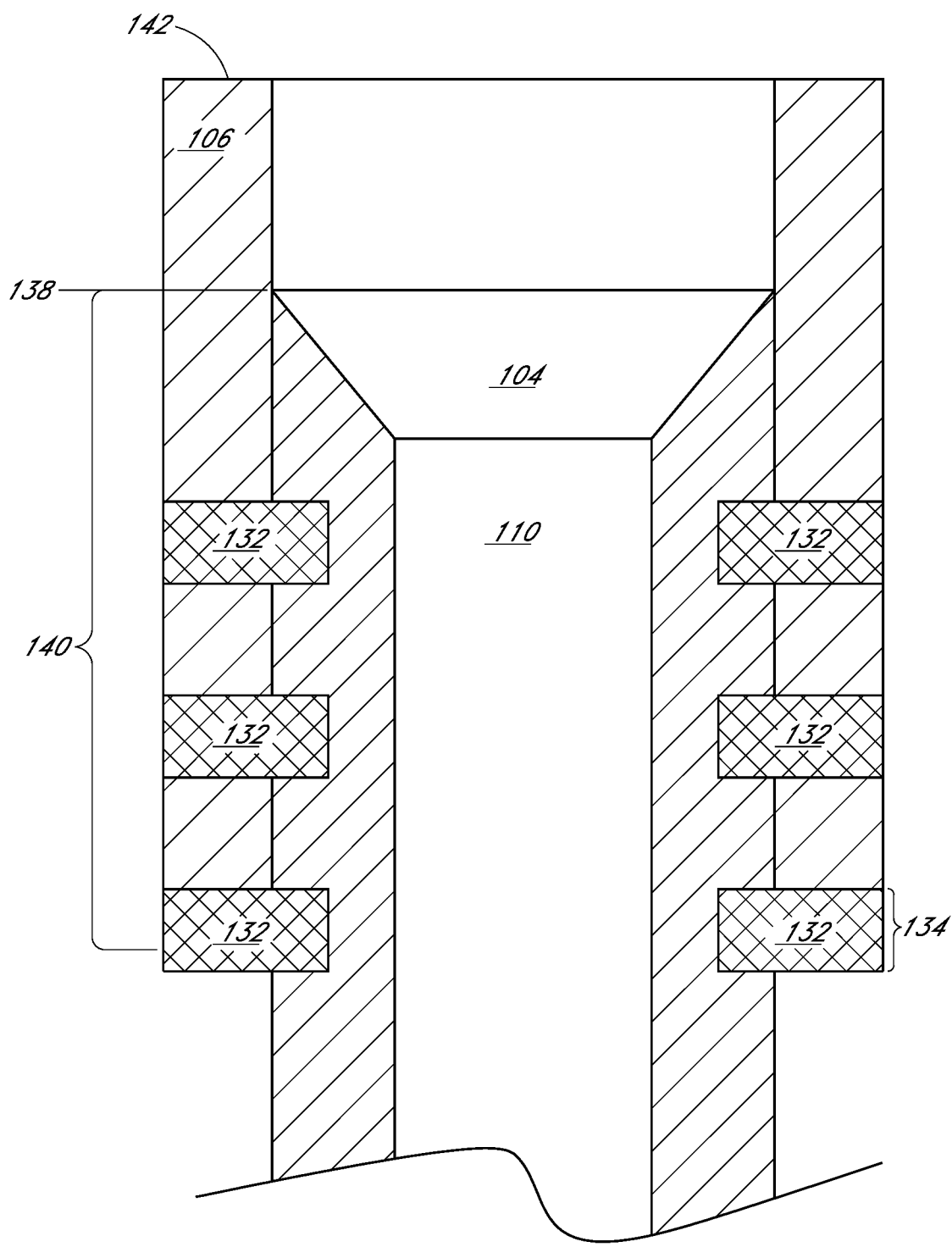
FIG. 5 shows a sixth alternative sleeve to mandrel connection provided in accordance with aspects of the present disclosure.

With reference now to FIG. 5, a sixth alternative sleeve 106 to mandrel 108 connection is provided in accordance with aspects of the present disclosure. A shear pin 132 may be inserted through the sleeve 106 that may have a first end 142 and a second end 144 (shown in FIG. 3) and partially through the body or wall thickness of the mandrel 108 at a lower end 136, elevation-wise, of an overlapping section 140 of the sleeve 106 and the mandrel 108 that may also have an upper end 138.

The spacer ring 112 has been omitted in FIG. 5 for clarity but may be incorporated to support the sleeve 106 as discussed above with reference to FIG. 3. There may be a plurality of shear pins 132 incorporated with the downhole tool 100 of the present embodiment, with a pin hole 134 for each shear pin 132. As shown, shear pins and pin holes are incorporated above the lowest set of shear pins, near the second end of the sleeve. For example, there can be shear pins and pin holes located in the overlapping section 140 of the sleeve and mandrel that are spaced from the spacer ring 112, such as being located above, elevation-wise, the spacer ring.

If more than one shear pin is used, the shear pins 132 may be spaced apart from each other. The spacing may be evenly distributed or unevenly distributed around the periphery of the sleeve and mandrel. The fitment of the shear pins 132 into the pin holes 134 may be snug. The shear pins 132 may have different lengths and the pin holes 134 may have different depths. The interface between the sleeve 106 and the mandrel 108 may also be typically bonded with adhesive or resin to further secure the two. Further, the location of each shear pin 132 and pin hole 134 relative to the second end 144 of the sleeve 106 may be similar to the locations discussed elsewhere herein, such as with reference to FIG. 3. The locations of the pin holes and shear pins can be selected to ensure overlapping between at least part of each shear pin, and therefore at least part of each pin hole, and the support rim 178 or lip 146 of the spacer ring 112 so that the support rim 178 can support the shear pins from rotating in case of a separation event between the sleeve and the mandrel.

Although limited embodiments of the of sleeve or coupling to mandrel assemblies and their components have been specifically described and illustrated herein, many modifications and variations will be apparent to those skilled in the art. For example, the various downhole tools may incorporate other components or fewer than the listed components on the mandrel, and the sleeve to mandrel may use a combination of designs disclosed herein, etc. Further, load bearing protrusions or threads formed on the mandrel optionally be used in combination with the connection features disclosed herein. Furthermore, it is understood and contemplated that features specifically discussed for one downhole tool embodiment may be adopted for inclusion with another downhole tool embodiment, provided the functions are compatible. Accordingly, it is to be understood that the downhole tool assemblies and their components constructed according to principles of the disclosed device, system, and method may be embodied other than as specifically described herein. The disclosure is also defined in the following claims.

The invention claimed is:

1. A composite downhole tool comprising:
   a composite sleeve having an elongated body made from a plurality of composite laminate layers having a length between a first end and a second end, an exterior surface, an interior surface defining a composite sleeve bore;
   a composite mandrel having an elongated body made from a plurality of composite laminate layers having a length, an exterior surface, and an interior surface defining a composite mandrel bore, at least part of the exterior surface of the composite mandrel located inside the composite sleeve bore and contacting at least part of the interior surface of the composite sleeve and defining an overlapped section that is fixed by adhesive bonding;
   a pin hole comprising a perimeter defining an opening, said perimeter located at a lower end, elevation-wise, of the overlapped section and at the composite mandrel below the second end of the sleeve or above the second end of the composite sleeve;
   a shear pin located in the pin hole;
   a spacer ring comprising a lip having a bore located around the mandrel; and
   wherein at least part of the shear pin overlaps the lip of the spacer ring.

2. The composite downhole tool of claim 1, wherein the pin hole is a first pin hole and further comprising a second pin hole located within the overlapped section entirely, and wherein a second shear pin is located in the second pin hole.

3. The composite downhole tool of claim 1, wherein the pin hole is a first pin hole and further comprising a second pin hole spaced from the first pin hole, said second pin hole comprising a perimeter defining an opening and said perimeter of the second pin hole located at the lower end, elevation-wise, of the overlapped section and at the composite mandrel below the second end.

4. The composite downhole tool of claim 1, wherein the pin hole extends from the exterior surface of the composite sleeve to the interior surface of the composite sleeve and extends from the exterior surface of the composite mandrel to a depth less than a total thickness of the composite mandrel to expose one or more of the plurality of composite laminate layers of the composite mandrel.

5. The composite downhole tool of claim 4, wherein the pin hole has varying depth along the perimeter of the pin hole.

6. The composite downhole tool of claim 4, wherein the pin hole on the composite mandrel has concave sides extending from the lower end of the overlapped section into the overlapped section or inclined sides extending from the lower end of the overlapped section into the overlapped section.

7. The composite downhole tool of claim 1, further comprising a slip ring, a slip wedge, and a packer ring located on the exterior surface of the composite mandrel.

8. The composite downhole tool of claim 1, further comprising a ball seat located within the composite sleeve bore.

9. The composite downhole tool of claim 1, wherein at least three spaced apart pin holes are located at a lower end, elevation-wise, of the overlapped section and at the composite mandrel below the second end.

10. The composite downhole tool of claim 1, wherein the at least three spaced apart pin holes are equally spaced apart from one another.

11. The composite downhole tool of claim 1, wherein only a part of the perimeter of the pin hole is formed through the exterior surface of the composite sleeve and all of the perimeter of the pin hole is formed through the exterior surface of the composite mandrel.

12. The composite downhole tool of claim 1, further comprising a spacer ring wherein the shear pin is in flush contact with a lip of the spacer ring.

13. A composite downhole structure comprising:
a tubular composite sleeve having an elongated body defined by a length, an exterior surface, and an interior surface defining a composite sleeve bore and a plurality of laminate layers including an innermost laminate layer defining, at least in part, the composite sleeve bore and an outermost laminate layer defining, at least in part, the exterior surface;
a composite mandrel having an elongated body defined by a length, an exterior surface, and an interior surface defining a composite mandrel bore, and a plurality of laminate layers including an innermost laminate layer defining, at least in part, the composite mandrel bore, and an outermost laminate layer defining, at least in part, the exterior surface;
a pin hole formed through the exterior surface of the composite sleeve, the plurality of laminate layers of the composite sleeve, and the interior surface of the composite sleeve;
a pin hole formed through the exterior surface of the composite mandrel and several layers of the plurality of laminate layers of the composite mandrel;
wherein the pin hole of the composite sleeve and the pin hole of the composite mandrel are aligned to define a common pin hole having a cavity with a partially enclosed perimeter at the composite sleeve and an enclosed perimeter at the composite mandrel; and
wherein a shear pin is located in the common pin hole so that at least some of the plurality of laminate layers of the composite sleeve and of the several laminate layers of the composite mandrel abut the shear pin to distribute load across multiple different laminate layers.

14. The composite downhole tool of claim 13, wherein the common pin hole is a first common pin hole and further comprising a pin hole formed through the exterior surface of the composite sleeve, the plurality of laminate layers of the composite sleeve, and the interior surface of the composite sleeve, and a pin hole formed through the exterior surface of the composite mandrel and several layers of the plurality of laminate layers of the composite mandrel, the pin hole of the composite sleeve and the pin hole of the composite mandrel aligned to define a second common pin hole having a cavity with an enclosed perimeter formed through the composite sleeve and the composite mandrel.

15. The composite downhole tool of claim 13, wherein the common pin hole is a first common pin hole and wherein a second common pin hole having a shear pin located therein is provided between the composite sleeve and the composite mandrel and spaced from the first common pin hole.

16. The composite downhole tool of claim 13, wherein the common pin hole has a top and a bottom, elevation-wise, and the perimeter of the common pin hole extends from the bottom of the common pin hole in a concave fashion or an inclined fashion.

17. The composite downhole tool of claim 16, wherein the perimeter has a round shape, a three-sided shape, an oval shape, or a polygonal shape with non-parallel sides.

18. The composite downhole tool of claim 13, wherein the shear pin is a first pin and the common pin hole is sized and shaped to accommodate a second shear pin located next to the first shear pin.

19. The composite downhole tool of claim 13, further comprising adhesive in the common pin hole.

20. The composite downhole tool of claim 13, wherein the composite sleeve has a first end and a second end, the first end is spaced from the composite mandrel and the second end surrounds the composite mandrel.

21. The composite downhole tool of claim 13, wherein the partially enclosed perimeter at the composite sleeve has a gap and the partially enclosed perimeter extends from the partially enclosed perimeter gap in a concave fashion or an inclined fashion.

22. The composite downhole tool of claim 21, wherein the gap is between 5% up to 48% of the perimeter.

23. The composite downhole tool of claim 13, further comprising a spacer ring wherein the shear pin is in flush contact with a lip of the spacer ring.

24. A method for forming a downhole tool comprising:
forming a composite tubular composite sleeve with a plurality of laminate layers, the tubular composite sleeve comprising a first end, a second end, an exterior surface and an interior surface defining a composite sleeve bore;
forming a composite mandrel with a plurality of laminate layers, said composite mandrel comprising an exterior surface and an interior surface defining a lengthwise composite mandrel bore;
fixing at least part of the exterior surface of the composite mandrel inside the composite sleeve bore and at least part of the interior surface of the composite sleeve and defining an overlapped section with an adhesive;
machining a pin hole at a lower end, elevation-wise, of the overlapped section and at the composite mandrel below the second end; and
positioning a shear pin in the pin hole so that at least some of the plurality of laminate layers of the composite sleeve and of the several laminate layers of the composite mandrel abut the shear pin to distribute load across multiple different laminate layers.

25. The method of claim 24, wherein the pin hole is a first pin hole and the shear pin is a first shear pin further comprising machining a second pin hole within the overlapped section entirely, and positioning a second shear pin in the second pin hole so that at least some of the plurality of laminate layers of the composite sleeve and of the several laminate layers of the composite mandrel abut the second shear pin to distribute load across multiple different laminate layers.

26. The method of claim 24, further comprising machining a pin hole on the composite sleeve that extends from the exterior surface of the composite sleeve to the interior surface of the composite sleeve and machining a pin hole on the composite mandrel that extends from the exterior surface of the composite mandrel to expose one or more of the plurality of composite laminate layers of the composite mandrel.

27. The method of claim 24, wherein the pin hole is a first pin hole further comprising machining a second pin hole spaced apart from the first pin hole located at the lower end, elevation-wise, of the overlapped section and at the composite mandrel below the second end.

28. The method of claim 24, further comprising inserting a spacer ring around the downhole tool such that the shear pin is in flush contact with a lip of the spacer ring.

\* \* \* \* \*